United States Patent Office 3,255,166
Patented June 7, 1966

3,255,166
POLYMER PURIFICATION
Howard James Bernhardt and Willis Frank Brondyke, Wilmington, Del., assignors to E. I. du Pont de Nemours and Company, Wilmington, Del., a corporation of Delaware
No Drawing. Filed Dec. 7, 1960, Ser. No. 74,219
2 Claims. (Cl. 260—88.2)

This invention relates to the purification of high molecular weight hydrocarbon polymers by the removal of catalyst and/or low molecular weight and amorphous fractions, and more specifically to the purification of polymers produced by the coordination polymerization of terminally mono-unsaturated hydrocarbons.

It heretofore has been known that terminally unsaturated hydrocarbons can be polymerized readily using coordination catalysts comprising reaction products of compounds, and preferably halides, of transition elements found in Groups III$b$, IV$b$, V$b$ and VI$b$ of the Periodic Chart of the Elements, such as is shown on pages 448–9 of the Handbook of Chemistry and Physics, 41st edition, 1959, and organometallic, metallic or metallic hydride reducing agents such as metal alkyls, Grignard reagents, alkali metals and metal hydrides. Polymers and copolymers which are prepared by means of the coordination polymerization process must be carefully purified to ensure removal of catalyst or catalyst residuet. Failure to do so may lead to degradation and discoloration of the polymer when it is subsequently heated, deterioration of its electrical properties and excessive corrosion of the process equipment which is used in the fabrication of the resin.

A unique feature of the hydrocarbon polymers prepared by means of this type of polymerization is that they are essentially free of long chain branches and, therefore, are linear in nature. A further characteristic of such polymers is that their physical properties are significantly different from those of polymers which, although produced from the same monomer, are not essentially free of long chain branches because of the use of a different type of polymerization catalyst. Still another feature of the polymers in question is the variety in molecular weights of the component fractions. This range of molecular weights and the relative amount of each fraction thereof are reflected in the physical properties of the product. A still further feature of these polymers is that those which are produced from a mono-substituted ethylene contain asymmetric centers and, hence, can exhibit a variety of configurations. It is well recognized that the properties of such polymers will vary depending upon the arrangement of these configurations. The arrangement may be such that the asymmetric centers having the same configuration are either regularly or randomly spaced along the main polymer chain. Such materials are referred to as stereoregular and stereorandom polymers, respectively, the former frequently being characterized by high stiffness and high crystallinity and the latter by their low stiffness and amorphous qualities. Both types may be formed through coordination polymerization. When it is desirable to prepare a hydrocarbon polymer which is predominately the stereoregular, highly crystalline material, it is preferable to use coordination catalysts of a special type, such as those which may be formed by reacting an organometallic compound containing at least one hydrocarbon radical bonded to metal with a prereduced transition metal halide of Group IV$b$ and V$b$ of the Periodic Chart of the Elements, the prereduction first being carried out using an essentially stoichiometric quantity of the organometallic to reduce the metal of the transition metal halide, wherein the metal is in its maximum valence state, by one valence state. The polymers used in the instant invention are prepared with either type of catalyst, but especially the latter type when it is desired to maximize the amount of stereoregular polymer.

From the above discussion it is apparent that there are at least three problems which may be encountered when coordination polymerizing terminally unsaturated hydrocarbons. To minimize subsequent degradation of the polymer, deterioration of properties, and corrosion of process equipment, the polymerization catalyst, after deactivation, must be removed completely or at least reduced to a negligible level. Furthermore, to approach the upper limit of product physical properties, particularly when polymerizing mono-substituted ethylenes, both the amorphous and the low molecular weight fractions of the polymer must be separated from the high molecular weight, stereoregular fractions. Finally, in the case of stereoregular polymers, it recently has become evident that to optimize certain characteristics, for example, to improve processibility of the resin, i.e., the ease with which it can be fabricated, or to tailor the physical properties to a given use, the amount of low molecular weight and amorphous material is preferably adjusted to some intermediate level between zero and that which is formed during the polymerization.

Coordination catalysts can be deactivated and removed by a variety of reagents including straight chain or branched chain alcohols, aryl or alicyclic alchols, alcohols having more than one hydroxyl group, such as the glycols, and metal chelating agents. At present the methods for either completely removing or merely controlling the low molecular weight and amorphous fractions are either inefficient or not widely applicable to all types of polymers and, hence, are unsatisfactory. For example, although polyethylene can be partially fractionated from a hydrocarbon solution to remove undersirable low molecular weight or highly soluble fractions using a variety of methods, such as supercritical fractionation or fractionation via evaporative or quench precipitation, application of these methods to the highly stereoregular polymers is not always feasible, possibly because of the inherent differences in solubilities between the polymers. Quench precipitation, for example, is satisfactory for removing the undersirable fractions from high molecular weight, stereoregular fractions, but the physical form of the recovered precipitate is such that additional steps are required to convert it into a useable product.

It is the object of this invention to provide a method by which the low molecular weight and amorphous fractions of the aforementioned essentially high molecular weight linear coordination polymers can be controlled at any desired level between zero and the level initially present after the polymerization. Concurrent with the above, it is the object of the invention to carry out the separation and control of the low molecular weight and amorphous fractions more economically and feasibly than heretofore possible using the methods known in the art. Another object of this invention is to integrate the process of polymer purification with the polymer preparation step to enhance its economic feasibility. Still another object of this invention is to integrate the process by which the amorphous and low molecular weight fractions are separated from the high molecular weight linear coordination polymers with that of catalyst removal so as to achieve the ultimate in economic feasibility by eliminating inefficient multistep operations. A further object of the invention is to prepare a product whose particle size and shape are such that it may be used directly in certain subsequent fabrication operations without prior compaction. Other objects will become apparent hereinafter.

According to the present invention a solution of the polymer obtained by the polymerization of monomers having the structure

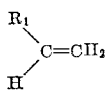

where $R_1$ is selected from the group consisting of hydrogen, alkyl and aryl substituents, by means of coordination catalysis in an inert hydrocarbon medium, is treated, at or above the polymerization temperature, with a sufficient quantity of an agent which can deactivate and solubilize the polymerization catalyst. It is then diluted with such a volume of a solution miscible polymer non-solvent, that the desired high molecular weight linear coordination polymer does not precipitate even though the amount of non-solvent may reach 90% by weight of the total mixture. On subsequent cooling the desired product separates with the undesired impurities remaining in solution. As an inert hydrocarbon medium may be used any aliphatic, cycloaliphatic or aromatic hydrocarbon solvent, or mixtures thereof, but the ones usually used because of the optimum combination of boiling temperature, dissolving ability and ease of recovery are hexane, heptane and cyclohexane, although aromatic solvents such as benzene and toluene also perform satisfactorily. The concentration of polymer in hydrocarbon is limited at low concentrations by the large volumes of solvent to be handled for a given weight of polymer and at high concentrations by the difficulties encountered in handling very viscous polymer solutions. In the present invention the optimum concentration levels range between 5 and 20 weight percent. After addition of the polymer non-solvent the hydrocarbon-precipitant-polymer solution is held at a temperature which is sufficiently high to ensure that all the polymer remains in solution. This generally has been found to be a minimum of 110° C. and a maximum of 250° C. The lower limit is convenient in that it approximates the temperature of polymerization, thus precluding excessive heating or cooling. Although the maximum temperature of 250° C. is feasible, it is desirable to limit the upper temperature to 180° C. to 200° C. to minimize any thermal degradation of the polymer. In practice, the lower and upper temperature limits are usually held at 110° C. and 160° C., respectively.

The agent which is used to deactivate and solubilize the catalyst is selected from the group consisting of alcohols and metal chelating agents. The amount used is at least stoichiometric with the metals in the polymerization catalyst. The alcohol may be a monohydroxy compound but equally well may be a di- or polyhydroxy compound, such as the glycols, glycerol and the like, while the chelating agent may be any one of the many chelate forming compounds which are compatible, both before and after reaction with the catalyst, with the media employed herein. Examples of the agents which may be used for catalyst deactivation-solubilization are the one to twelve carbon atom monohydroxy alcohols, preferably those aliphatic in nature, and usually containing four or five carbon atoms, such as n-butyl alcohol or isoamyl alcohol. Other examples would include the many chelating agents such as the diketonic, hydroxyketonic and aminoketonic reagents. Acetylacetone has been found to be a good example of a chelating agent.

The precipitant (polymer non-solvent) may be any chemical which is compatible with the hydrocarbon solvent employed, but which is a non-solvent for the polymer, and usually consists of an oxygen containing chemical such as an alcohol, ketone, ether, ester and the like. The precipitant usually is chosen on the basis of its ability to precipitate the desired product at a given set of conditions and also on the basis of the ease of its subsequent separation and recovery from the hydrocarbon solvent. Alcohols containing from one to twelve carbon atoms, and preferably aliphatic alcohols, are usually employed. Polymer precipitation is favored by aliphatic alcohols of low carbon content and in the present invention four and five carbon atom alcohols, such as n-butyl alcohol or isoamyl alcohol, are preferred. The amount added may be from about 2–90 weight percent of the total mixture but usually varies between 35–60 weight percent and preferably about 50 weight percent.

After the hydrocarbon polymer solution is diluted with precipitant as hereinabove described, the solution temperature is reduced to less than 110° C. but not less than 20° C. to induce precipitation of the desired product. The temperature chosen is dependent on a number of variables including the specific polymer, the initial polymer solution concentration, the hydrocarbon solvent, the precipitant, the amount of precipitant, and finally, the special qualities desired in the product, which includes not only the amount of amorphous and low molecular weight fractions remaining, but, for example, the ease of filterability of the product after precipitation, since it has been found that the lower precipitation temperatures favor the formation of a product which is more easily filtered. All the above considerations most frequently are met by maintaining a precipitation temperature between about 20° C. and 85° C. and usually between 50° C. and 75° C.

An important feature of the present invention is that the low molecular weight and amorphous polymer fractions are more efficiently separated from the high molecular weight linear coordination polymer fractions than is possible using conventional extraction techniques. This may be seen from the results of the following experiment in which the effectiveness of removal is judged by examining the product stiffness, a property which is correlatable with the weight fraction of amorphous and low molecular weight material present. In the one case the polymer is purified according to the procedure of the current invention, while for comparison a similar polymer is extracted with aromatic hydrocarbon to remove the amorphous and low molecular weight fractions. Polymer which is processed in accordance with the present invention increases in stiffness from 77,000 p.s.i. to 144,000 p.s.i. with a material loss of 12% while a similar polymer having a stiffness of 79,000 p.s.i. loses 33% of its total weight after repeated extraction with aromatic hydrocarbon until the stiffness is raised to 139,000 p.s.i.

The nature of the instant invention is such that it is amendable to integration with the polymer preparation step. The condition that the polymer be in solution before addition of the polymer precipitant may be met by conducting a solution polymerization so that the final concentration of dissolved polymer in hydrogen solvent is between 5 and 20 weight percent. Polymers prepared by a slurry process may be diluted with additional solvent, if necessary, and subsequently dissolved to give the required polymer solution. As will be seen from the following the catalyst deactivation and solubilization may be integrated quite satisfactorily so as to present an extremely desirable and feasibile polymerization-purification process.

A hydrocarbon solution of the polyolefin, the polyolefin having been produced by coordination polymerization, is diluted, while maintaining the temperature of the solution, with a compound which converts the catalyst to a soluble derivative and which is selected from the group consisting of alcohols and metal chelating agents, the quantity of the compound being at least stoichiometric with the metal from the polymerization catalyst. Once again it is emphasized that the alcohol may be not only a monohydroxy, but a di- or polyhydroxy compound as well, while the chelating agent may be any one of the many metal chelate forming compounds which are compatible, both before and after reaction with the catalyst, with the media employed herein. Since by the present invention the catalyst deactivation is effected prior to any isolation of the product, the efficiency of catalyst removal is enhanced. In many other methods of polymer purification the active catalyst, being entrapped within the polymer particles and having a high reactivity toward such common materials as water and oxygen, is difficult to remove, not only because of this entrapment, but because the products formed after its reaction with these common materials are less reactive toward the deactivator.

It is evident from the above that in some cases the catalyst deactivator-solubilized may be the same as the polymer precipitant. Where the two materials are the same, additional advantages become apparent, such as for example, the need for fewer reagents and the simplified separation and recovery of reagents from the hydrocarbon solvent. The preferred embodiment is to employ the same reagent for catalyst deactivation and polymer precipitation. Once again, the preferred reagent is an alcohol containing from one to twelve carbon atoms, and especially the aliphatic alcohols. The limitation on the length of the carbon atom chain of the alcohol used as the precipitant, previously mentioned as favoring the lower members of the series, may be contrasted with the length of the alcohol chain desirable to provide not only optimum reactivity with the catalyst but reactivity accompanied by formation of soluble alcoholates. The latter is favored by the higher members of the series. The reagents best serving both requirements are those alcohols containing four to twelve and preferably four or five carbon atoms, and in particular, n-butyl alcohol or isoamyl alcohol.

The hydrocarbon polymers whose purification can be effected by means of this invention are those which are prepared by coordination polymerization and include those which contain asymmetric centers along the main polymer chain. Examples of these are the wide variety of polymers and copolymers which may be produced using such monomers as propylene, 1-butene, styrene, 3-methyl-1-butene, 4-methyl-1-pentene, mixtures of propylene and ethylene or 1-butene, propylene and 3-methyl-1-butene, propylene and 4-methyl-1-pentene and the like. Furthermore, it has been found that homopolymers from ethylene, although not containing separable configurational isomers, may be processed according to the present invention to remove coordination catalysts and low molecular weight or highly soluble fractions.

In accordance with the invention as hereinabove set forth the following description is given to exemplify but not to limit a completely integrated process by which the polymer, in this example polypropylene, is prepared, purified and isolated.

A catalyst preparation tank is charged with a hydrocarbon solvent, preferably hexane, heptane, or cyclohexane, to which is added titanium tetrachloride and aluminum triisobutyl, with the molar quantity of organo-metallic being slightly greater than the stoichiometric amount necessary to reduce the valence of titanium to three. The temperature for the reduction may be 100–250° C. The resultant titanium trichloride slurry is cooled to 30–110° C. and is activated with a quantity of aluminum triethyl which is two times the molar quantity of the titanium tetrachloride. The catalyst slurry is transferred, in an amount which is determined by the contact time and the quantity of unreacted monomer desired during the polymerization, along with additional hydrocarbon if necessary, to a batch or constant environment continuous solution process reactor which is pressured to 200–600 p.s.i. with propylene at 110–120° C. After the desired conversion of monomer to polymer is complete and unreacted monomer has been removed (not essential), an 8 weight percent solution of the polymer in hydrocarbon is diluted with n-butyl alcohol to convert the catalyst to soluble alcoholates, the amount of alcohol being in excess of the stoichiometric quantity required by the catalyst. The solution is transferred to a crystallizing tank where additional n-butyl alcohol is added to reduce the temperature to about 70° C., the concentration of alcohol thereby reaching 50 weight percent of the total solution. If desired the entire alcohol may be added during catalyst deactivation, in which case the hot solution is cooled externally or by solvent evaporation after transfer to the crystallizing tank. The precipitated product is recovered by means of a centrifuge or a continuous filter, washed with a fresh n-butyl alcohol-hydrocarbon mixture, or preferably with pure hydrocarbon, to displace the remaining liquor containing solubilized catalyst and undesirable polymer, and dried in a rotary, fluidized bed or pneumatic dryer. The free flowing powder may be blended with additives, if desired, and compacted by extrusion, although as indicated previously, for certain applications the free flowing powder may be used directly without additional compaction. The recovered mother liquors may be separated into their component parts for subsequent recycling.

The following examples are given to further demonstrate the invention. Although the examples emphasize only the removal of stereorandom and low molecular weight fractions from high molecular weight stereoregular fractions, they might be expanded to include the combined polymerization-catalyst deactivation process and also to show the feasibility of the process when the polymer being treated is coordination polyethylene. By the above procedure the catalyst residue, as measured by ash content of the product, may be reduced to less than 0.1% and usually less than 0.01%. Commonly, for example, the products contain no more than 50 parts per million of ash. The base polymer, polypropylene, such as would be obtained in Examples I–IV without the non-solvent treatment, has a melt index of 1.3, a stiffness of 77,000 p.s.i. and contains 13.6 weight percent of a refluxing benzene soluble fraction. The polymer which is used for Examples V and VI already has been pretreated to deactivate the catalyst and when isolated directly without the non-solvent treatment has a stiffness of 69,000 p.s.i. and a melt index of 0.8. Stiffness measurements on the products are made by means of the standard A.S.T.M. Test No. D–747, melt index measurements, by A.S.T.M. Test No. D–1238–57T.

*Example I*

A 5% solution of polypropylene in heptane, passing through a continuous unit operating at 5 pounds polymer solution per hour, is diluted with an equal weight of isoamyl alcohol while maintaining the temperature at about 140° C. Upon subsequent cooling to 70° C. the product precipitates, whereupon it is filtered and dried. The stiffness is 149,000 p.s.i. and the residual amorphous-low molecular weight fraction, as measured by the amount soluble in refluxing benzene is 3.2%, while the melt index is 0.7.

*Example II*

A 5% solution of polypropylene in hexane, passing through a continuous unit at a rate of 5 pounds polymer solution per hour, is diluted with an equal weight of isoamyl alcohol while maintaining the temperature at about 140° C. The product which is precipitated by cooling the solution to 65° C. is isolated and dried and has a stiffness of 146,000 p.s.i., a residual amorphous-low molecular weight fraction, measured as above, of 1.2%, and a melt index of 0.8.

*Example III*

A 5% solution of polypropylene in hexane, passing through a continuous unit at a rate of 5 pounds polymer solution per hour, is diluted with an equal weight of n-butyl alcohol while maintaining the temperature at about 140° C. The product which is precipitated by cooling the solution to 65° C. is isolated, washed with hexane and dried and has a stiffness of 148,000 p.s.i. and a residual amorphous-low molecular weight fraction, measured as above, of 2.8%.

Example IV

A 5% solution of polypropylene in hexane, passing through a continuous unit at a rate of 5 pounds polymer solution per hour, is diluted with twice its weight of n-butyl alcohol while maintaining the temperature at about 140° C. The product which is precipitated by cooling the solution to 75° C. is isolated, washed with hexane and dried and has a stiffness of 137,000 p.s.i., a residual amorphous-low molecular weight fraction, measured as above, of 2.0%, and a melt index of 0.7.

Example V

In order to show that the temperature chosen for precipitation and filtration can be used to control the properties and characteristics of the products, a series of batch experiments is carried out using a 10% solution of polypropylene in hexane, to which is added an equal weight of n-butyl alcohol. The temperature is reduced from about 140° C. to 30–75° C. to precipitate the product which is washed with hexane and dried. The effect of precipitation temperature is best seen from the following table:

| Precipitation Temperature (° C.) | Percent Remaining in Solution | Stiffness, p.s.i. | Percent Benzene Extractables |
|---|---|---|---|
| 30 | 16.1 | 130,000 | 4.28 |
| 50 | 19.5 | 154,000 | 1.79 |
| 60 | 22.6 | 156,000 | 1.72 |
| 65 | 23.5 | 158,000 | |
| 75 | 33.0 | 166,000 | 1.65 |

Example VI

In order to show that the ratio of polymer non-solvent to polymer solvent likewise can be used to control the properties and characteristics of the products, a series of batch experiments is carried out in which the weight ratio of n-butyl alcohol to hexane is varied from 0.25 to 4.0 while the precipitation temperature is held constant. The results may be seen from the following table:

| Wt. Ratio, n-Butyl Alcohol/Hexane | Percent Remaining in Solution | Stiffness, p.s.i. | Percent Benzene Extractables |
|---|---|---|---|
| 0.25 | 26.0 | 165,000 | 0.92 |
| 0.67 | 23.5 | 149,000 | 1.71 |
| 1.5 | 15.4 | 125,000 | 4.18 |
| 4.0 | 7.5 | 110,000 | 8.13 |

Example VII

Using the method described in Example I, the replacement of polypropylene with coordination polyethylene gives rise to a product having superior stiffness, a lower refluxing benzene soluble fraction and a lower ash content than the same polymer which is not treated in this manner.

Example VIII

Replacement of polypropylene with poly(1-butene) using a method similar to that in Example I, except that the precipitation is carried out at a lower temperature because of the higher solubility of the polymer in the standard hydrocarbon solvents, gives rise to a product having superior stiffness, a lower ash content and a lower refluxing pentane soluble fraction [stereoregular poly(1-butene) is soluble in refluxing benzene] than the same polymer which is not treated in this manner.

Example IX

Using the method described in Example VIII, the replacement of poly(1-butene) with poly(3-methyl-1-butene) gives rise to a product having superior stiffness, a lower refluxing pentane soluble fraction and a lower ash content than the same polymer which is not treated in this manner.

Example X

Using the method described in Example VIII, the replacement of poly(1-butene) with poly(4-methyl-1-pentene) gives rise to a product having superior stiffness, a lower refluxing pentane soluble fraction and a lower ash content than the same polymer which is not treated in this manner.

In addition to the advantages of this invention as set forth hereinabove, namely the formation of a product which has less tendency to degrade on heating, deteriorate in electrical properties or corrode process equipment, and which has the optimum physical properties for its particular use, other advantages are apparent. For example, objects fabricated from resins treated according to this invention have a glossy, grease-free surface, in contrast to those which are dull and greasy because of the exudation of the undesirable components to the surface when the resins are not so treated.

We claim:

1. In a process for the preparation of normally solid hydrocarbon polymers wherein the polymers are obtained by the polymerization of monomers having the structure:

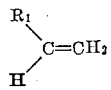

where $R_1$ is selected from the group consisting of hydrogen, alkyl and aryl substituents, with a catalyst obtained by the reaction of a transition metal halide, wherein the metal is selected from elements in Groups IIIb, IVb, Vb, and VIb of the Periodic Chart of the Elements, with a reducing agent selected from the class consisting of organometallic compounds, metal hydrides and metals in Groups Ia, IIa, and IIIa of the Periodic Chart of the Elements, the steps which comprise adding to a solution of said polymer in an inert hydrocarbon solvent, at a temperature of 110–250° C., a chelating agent, compatible, both before and after reaction with the catalyst, with the media employed, in quantities at least stoichiometric with the metals of said catalyst, while maintaining the polymer in solution, and thereafter adding a solution miscible polymer non-solvent and cooling to less than 110° C. but not less than 20° C. to induce precipitation of the polymer, said polymer non-solvent comprising 35–60 weight percent of the total solution after its addition and being selected from the group consisting of alcohols, ethers, ketones and esters, and thereafter recovering a polymer precipitate which is free of catalyst and polymer fractions which are soluble in the resultant media and which contains less than 0.1% of a catalyst residue.

2. Process of claim 1 wherein the chelating agent is acetylacetone.

References Cited by the Examiner

UNITED STATES PATENTS

| 2,845,412 | 7/1958 | Heyson | 260—94.9 |
| 2,890,214 | 6/1959 | Brightbill et al. | 260—94.9 |
| 2,908,671 | 10/1959 | Hochgraf et al. | 260—93.7 |
| 2,962,488 | 11/1960 | Horne | 260—94.9 |
| 3,055,879 | 9/1962 | Wride | 260—94.9 |
| 3,075,960 | 1/1963 | Lovett et al. | 260—94.9 |
| 3,083,192 | 3/1963 | Davison et al. | 260—94.9 |

FOREIGN PATENTS

| 222,017 | 5/1959 | Australia. |
| 832,996 | 4/1960 | Great Britain. |

JOSEPH L. SCHOFER, *Primary Examiner.*

LESLIE H. GASTON, *Examiner.*